March 16, 1943. F. F. KISHLINE 2,313,946
STEERING LINKAGE
Filed Nov. 27, 1940
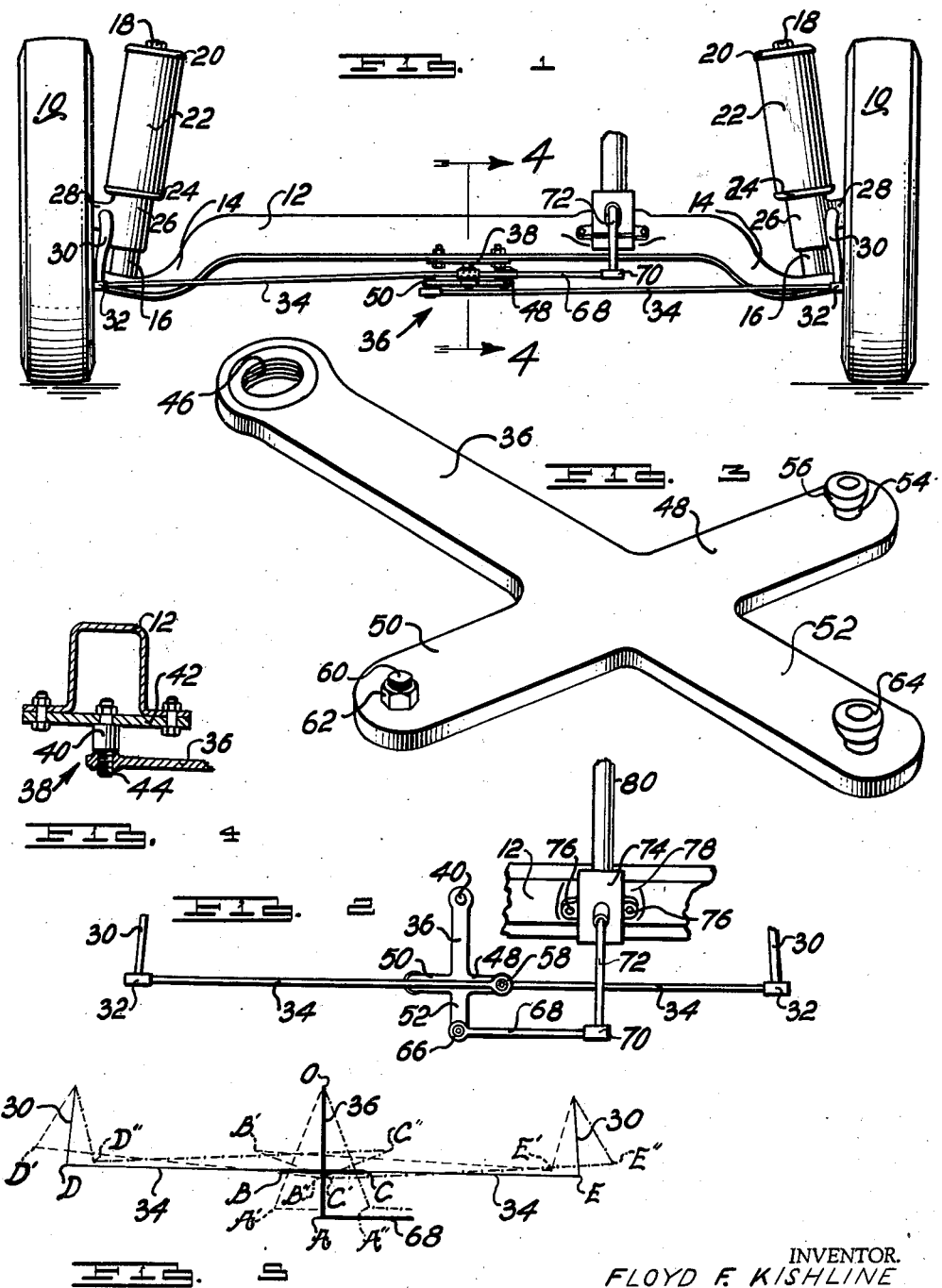
INVENTOR.
FLOYD F. KISHLINE
BY Carl J. Barker
his ATTORNEY.

Patented Mar. 16, 1943

2,313,946

UNITED STATES PATENT OFFICE 2,313,946

STEERING LINKAGE

Floyd F. Kishline, Kenosha, Wis., assignor to Nash-Kelvinator Corporation, Kenosha, Wis., a corporation of Maryland Application November 27, 1940, Serial No. 367,313

4 Claims. (Cl. 280—96)

This invention relates to steering linkages for application particularly to automotive vehicles.

With the usual type of steering linkage it has been considered essential to locate the steering gear, which supports a pitman arm and which is connected to the steering arms of the wheel spindles by means of drag links and radius rods, to the rear of a line joining the king pins about which the wheels are swiveled for steering movement. This practice has been considered necessary because of the principles derived by Ackerman which recommend that the steering arms converge rearwardly from the axes of the king pins so that the steering arm axes will meet upon the center line of the vehicle, roughly four-fifths (⅘) of the distance toward the rear of the vehicle. The purpose of this has been to induce the outer wheel of the pair of steering wheels to turn about a greater radius of curvature than the inner wheel. This is due to the outer wheel taking the greater load in negotiating a curve and the necessity for the inner wheel to travel about a circle of smaller circumference and at the same time prevent sliding or skidding of the inner wheel as it negotiates the turn. Because of the necessity for employing the converging relationship, the steering gear was usually located upon a frame side member, and the linkage, which connected the gear with the wheels, extended beneath the frame.

The tendency in the last few years to relocate and redistribute the weight upon the wheels of the vehicle has resulted in the motor being moved further forward upon the chassis and into a position where it will interfere with the proper placement of the steering linkage. In order to eliminate any possibility of interference between the motor crank case and the steering linkage, it has been customary for manufacturers to relieve the oil pan of the motor by distorting it upwardly in order to provide passage for the linkage. This situation is even further emphasized in shorter wheel base vehicles by the tendency to enlarge the passenger space of the vehicle and thus shorten the space which is available for the motor. In some cases this diminution of motor space has been so marked as greatly to interfere with the provision of a proper oil reservoir within the oil pan and consequently with the proper lubrication of the motor.

The present invention has for its object the provision of a steering linkage which will employ the Ackerman principles and yet will provide adequate clearance room beneath the motor for the use of a properly sized oil pan. It has also been considered essential in the past to locate the king pins of the steering wheels in such a position that their axes, when extended, will intersect the ground within or fairly close to the tread of the respective tire. This necessarily involves placement of the king pin in a position fairly close to the brake backing plate of the wheel and introduces a serious limitation upon the employment of Ackerman's principle toward the front of the vehicle or ahead of the line of centers of the wheel spindles.

The reason for this lies in the fact that ahead of the wheel centers it is necessary for the arms to diverge in order for their major axes to intersect upon the center line of the vehicle about four-fifths (⅘) of the distance to the rear of the car. It will be immediately apparent that a proper amount of divergence of the steering arms will result in such arms interfering with the brake backing plate. It is the purpose of this invention to eliminate at least a portion of the necessary steering arm divergence toward the front of the vehicle by providing mechanisms within the steering linkage itself which will compensate for such lack of divergence.

Although the invention is illustrated as applied to a specific suspension system, it will be recognized that it has wide application to other forms of suspension systems and that the linkage itself may be altered materially without parting from the spirit of the invention.

Referring to the drawing which illustrates one form of the invention:

Figure 1 is a front elevational view of an automotive vehicle, parts being removed for clarity;

Figure 2 is a plan view of the linkage shown in Figure 1, parts being shown broken away;

Figure 3 is a perspective view of the center idler arm;

Figure 4 is a longitudinal sectional view of the linkage and associate parts taken upon a plane as indicated by the line 4—4 of Figure 1 and looking in the direction of the arrows; and, Figure 5 is a diagrammatic plan view of the linkage.

Referring more specifically to the drawing in which similar parts are designated by similar reference characters, the invention is shown as applied to a steering linkage for a wheel suspension in which the wheels 10 at each side of the car are supported from a channel-shaped front axle 12 which is rigidly secured to the frame (not shown) of an automobile. At each side of the car the front axle 12 has its ends dipped downwardly as at 14 to provide a seat against which the lower end of a king pin 16 is rigidly secured. The king pins 16 are inclined upwardly and inwardly so that their axes will extend through or adjacent to the tread of the vehicle wheel 10 upon the ground.

The upper end of each king pin has secured to it by means of a cap screw 18, the upper spring seat 20 against which the upper end of a coil spring (not shown) is seated. The coil springs are enshrouded by an extensible bellows 22 (diagrammatically shown) also secured to the spring seat 20, and the lower end of the coil spring is seated against a seat 24 supported upon the top surface of a steering knuckle 26 journaled upon the king pin 16. This general type of suspension is known as the Lancia suspension and has been employed upon the Lancia car of Italian origin for some years.

The steering knuckle 26 is fabricated from a forging and is provided with a wheel spindle support 28 which extends laterally to provide a journal (not shown) upon which the wheel rotates in moving over the ground. The steering knuckle 26 is adapted to be rotated about the axis of the king pin 16 to impart steering movement to the ground wheel 10.

A steering arm 30 is secured by any suitable means within an aperture formed in the steering knuckle extension 28, and the arms on each side of the vehicle are so proportioned that they extend forwardly, outwardly and downwardly from their points of connection with the spindle extension 28 so that the arms on opposite sides of the vehicle diverge toward the front of the vehicle. It will be noted that the degree of divergence of the steering arms 30 is considerably limited by the proximity of the forward portions of such arms to the wheel 10 and to the brake mechanism which is supported upon the wheel and upon the wheel spindle. Consequently, the steering arms 30 do not diverge to a sufficient extent to permit their axes to intersect upon the center line of the car in accordance with the Ackerman principles. A study of the various views of the drawing will lead one to the conclusion that these arms will intersect only at a point to the rear of the vehicle and lying entirely outside the vehicle. This is not desirable inasmuch as the degree of divergence should be greater in order to reap the benefits of Ackerman's principles. However, the Ackerman effect is obtained by means shortly to be described.

The forward end of each of the steering arms 30 is provided with a ball end received within a spherical socket (not shown) formed upon the outer ends 32 of each of the tie rods 34. The tie rods 34 are connected at their inner ends to an idler guide link 36 pivoted at 38 by means of a stud 40 rigidly secured to a plate 42 spanning the underside of the axle 12 centrally thereof. The pivotal connection 38 may be formed by internally tapping the idler guide link 36 at 46 and mating such internal threads with external threads 44 formed upon an extension of the stud 40.

The idler guide link 36 is formed in the shape of a Latin cross, with laterally extending arms 48 and 50 and with a forwardly extending portion 52. The arm 48 upon the left side of the vehicle is provided with a stud 54 formed with an upwardly projecting portion 56 which is partially spherically shaped for cooperation with a semispherically shaped socket formed within the end 58 of the tie rod 34 extending from the right side of the vehicle to the idler guide link 36. The right arm 50 is provided with a downwardly extending stud, the upper end of which appears in Figure 3 as the threaded portion 60 which is secured to the arm portion 50 by means of a nut 62. It will be understood that the portion of the stud 60 below the arm 50 has a shape similar to that portion of the stud 54 which appears in Figure 3. Stud 60 cooperates with the tie rod 34 extending from the left side of the vehicle in the same fashion as stud 56 cooperates with the socket 58.

The outer end portion 52 of the idler guide link 36 is provided with a stud 64 shaped similarly to the stud 54 for cooperation with socket 66 formed on the end of a drag link 68. Drag link 68 terminates at its other end in a socket 70 which receives the ball end (not shown) of the pitman arm 72 projecting forwardly and downwardly from the steering gear 74. The steering gear 74 is supported by means of studs 76 upon a flattened portion 78 of the front axle member 12 and is provided with the usual steering column 80 through which a shaft extends to impart motion to the gear 74.

It will be noted that each of the tie rods 34 extend past the center line of the car as represented by the stud 40 and are joined to the idler guide link upon its opposite sides so that the links are crossed over one another above and below the idler guide link 36.

By reference to Figure 5, it will be noted that the idler guide link 36 is there defined at its four point connection with other parts of the assembly by the letters O, A, B, and C, which represents respectively the connections 40, 64, 60 and 56. The entire system, of course, is adapted to be rotated about the point O with the link 36 in the position O—A coinciding with the central longitudinal plane of the vehicle when the steering wheels are in the straight ahead movement position of the vehicle. Movement of the drag link 68 to the right (to the left as viewed in Figure 5) results in movement of the point A to a position A' and in simultaneous movement of the points B and C to the points B' and C'. Since the tie rods 34 must follow movement of the idler guide link 36, the points D and E will be moved respectively to the positions designated D' and E' respectively. It should be noted that this movement of the steering linkage will result in the point D' being displaced a greater distance laterally and angularly from the point D than the point E' is displaced from point E since the tie rods 30 are equal in length, and the effect of this greater displacement will be to turn the wheel 10 upon the right side of the vehicle (the left side as viewed in Figure 5) through a greater angularity with respect to the center line of the vehicle than the left wheel 10 is turned. This results in the right wheel, which is the inside wheel upon the right turn, following a shorter radius of curvature than the outside wheel. Although the outside wheel controls in such a turn because of the fact that it bears most of the load due to centrifugal force, a small amount of load is borne by the inside wheel, and it is important that it not be permitted to slide or skid in making the turn.

The reason for the greater displacement of the point D' with respect to the point D than is present between the points E and E' is due to the application of the principles of simple harmonic motion. It is necessary to trace this back to the idler link 36 in which the point B, when the linkage is rotated for a right turn, is moving away from the line O—A which represents the position in which the greatest lateral movement will take place for any part attached to the link 36. At the same time the point C is moved so that it approaches the line O—A and, therefore, is approaching the point for maximum lineal movement laterally of the vehicle. Also note that points B and C are equally spaced from line O—A upon initiation of the steering movement.

When the linkage is rotated to produce a left turn by moving the point A to the point A'', the conditions of movement upon the points D and E are reversed, again due to the fact that certain points upon the link 36 are approaching their maximum increment of movement laterally of the vehicle, while other points are approaching the minimum increment of movement laterally of the vehicle. Consequently, the point D'', representing the left turn position of the right link steering arm 30, is separated from the point D a smaller distance than the point E'' is separated from the point E. It should be appreciated that this type of linkage could be applied to any type of suspension and is particularly useful when the linkage is supported ahead of the vertical transverse plane including the king pins.

It will be understood that it is possible to eliminate the idler guide link 36 by forming the pitman arm in a T-shape to correspond to the link 36 having transverse arms 48 and 50 in which case the forwardly extending arm 52 would be omitted. It would also be necessary to extend one tie rod and shorten the other (because of the necessity for locating the steering gear upon one side of the vehicle) depending upon whether the vehicle were constructed for right hand or left hand steering. Steering movement would then be imparted to the link directly from the steering gear through the pivot point at its rear end upon the vehicle. The operation of the linkage would remain the same in principle as that illustrated in the drawing.

Although the invention has been described with considerable particularity, this specification is not to be taken as limiting the invention to any particular arrangement of parts such as shown and described for illustrative purposes since various modifications will be apparent from the teachings of the invention and the scope thereof as defined in the appended claims.

What I claim is:

1. In an automotive vehicle, a rigid cross member forming a support for dirigible road wheels and a steering linkage comprising, a centrally disposed idler guide link pivoted to said cross member and projecting forwardly therefrom, steering arms connected to said dirigible wheels and diverging forwardly therefrom, tie rods connecting said steering arms to said idler guide link, and a steering gear mounted upon said cross member and arranged to move said idler link about its pivoted support, each of said steering tie rods being articulated to said idler guide link at a point closer to the opposite steering arm than to the steering arm to which it is operatively connected.

2. Steering linkage for a pair of dirigible road wheels including a rigid axle for supporting said wheels, steering arms connected to said wheels and diverging forwardly in front of said axle, a pair of tie rods having their inner ends in transversely overlapping relation and having connections at their outer ends with the forward end of said steering arms, an idler guide link arranged centrally of said axle and pivoted thereto at one end, articulations between said idler guide link and said tie rods, the articulation for each tie rod with the idler guide link lying at the opposite side of the vehicle center line from the wheel connection for said rod, and a steering gear rigidly attached to said axle and arranged to oscillate said idler link.

3. In a motor vehicle having front steering ground wheels each provided with a steering arm, a rigid cross member on which said wheels are mounted, a steering gear secured to said cross member at one side of the longitudinal vertical mid-plane of the vehicle and having a pitman arm adapted to be swung to either side of a normal position thereof corresponding to straight ahead vehicle travel, tie rods articulated at their outer ends to said steering arms respectively, a drag link articulated at its outer end to said pitman arm and extending transversely of the vehicle, an idler guide link pivotally supported on the center of said cross member and extending longitudinally forwardly therefrom, and means articulating the inner ends of the tie rods and the drag link to the idler guide link, said tie rods overlapping one another and each extending past the longitudinal vertical plane including the idler guide link, and being arranged one above and one below said idler guide link.

4. In a motor vehicle having steering ground wheels and a steering gear provided with a pitman arm, a rigid cross member on which said wheels and gear are mounted, an idler guide link normally disposed approximately in the vertical longitudinal mid-plane of the vehicle, a pivotal support for the rear end of the guide link on the center of said cross member accommodating swinging movement of the forward end of the guide link transversely of the vehicle to either side of said mid-plane, a drag link extending transversely of the vehicle and articulated between the pitman arm and the forward end of the guide link, said idler link including a transversely extending central portion, and a tie rod articulated between each of the wheels and the transverse central portion of the guide link, the points of articulation between the tie rods and the guide link being disposed symmetrically with respect to said mid-plane and located upon that side of the guide link more remote from their respective ground wheel, and the point of articulation between the drag link and guide link being located substantially within said mid-plane when the wheels are positioned for straight ahead vehicle travel.

FLOYD F. KISHLINE.